(12) United States Patent
Puellen et al.

(10) Patent No.: US 8,064,047 B2
(45) Date of Patent: Nov. 22, 2011

(54) METHOD AND APPARATUS FOR CONTACTLESS DETERMINATION OF A LATERAL OFFSET RELATIVE TO A STRAIGHT-AHEAD DIRECTION

(75) Inventors: Lukas Puellen, Giessen (DE); Dietmar Kaul, Wetzlar (DE); Michael Doerr, Hohenahr (DE)

(73) Assignee: Kistler Holding AG, Winterthur (CH)

( * ) Notice: Subject to any disclaimer, the term of this patent is extended or adjusted under 35 U.S.C. 154(b) by 0 days.

(21) Appl. No.: 12/540,989

(22) Filed: Aug. 13, 2009

(65) Prior Publication Data

US 2009/0303459 A1 Dec. 10, 2009

Related U.S. Application Data

(63) Continuation of application No. PCT/DE2008/000278, filed on Feb. 15, 2008.

(30) Foreign Application Priority Data

Feb. 15, 2007 (DE) .................. 10 2007 008 002

(51) Int. Cl.
*G01P 3/36* (2006.01)
(52) U.S. Cl. ......................................... 356/28; 356/614
(58) Field of Classification Search .................. 356/4.01, 356/28, 28.5, 141.2, 614; 382/103, 106, 382/107
See application file for complete search history.

(56) References Cited

U.S. PATENT DOCUMENTS

| | | | |
|---|---|---|---|
| 4,162,509 A | 7/1979 | Robertson | |
| 4,671,650 A * | 6/1987 | Hirzel et al. | ................ 356/28 |
| 5,020,903 A | 6/1991 | Sakai et al. | |
| 5,371,677 A | 12/1994 | Ehret et al. | |
| 6,108,435 A * | 8/2000 | Mori et al. | ................ 382/106 |
| 6,718,133 B2 * | 4/2004 | Nakata et al. | ................ 396/96 |
| 6,768,540 B2 * | 7/2004 | Kanemitsu | ................ 356/3.14 |
| 6,801,639 B2 * | 10/2004 | Nonaka et al. | ................ 382/106 |
| 7,161,133 B2 | 1/2007 | Visee | |

(Continued)

FOREIGN PATENT DOCUMENTS

DE 40 30 653 A1 4/1992

(Continued)

OTHER PUBLICATIONS

International Searh Report dated Jul. 3, 2008 with partial translation (six (6) pages).

*Primary Examiner* — Isam Alsomiri
(74) *Attorney, Agent, or Firm* — Crowell & Moring LLP

(57) ABSTRACT

Method and apparatus for contactless determination of lateral offset relative to a straight-ahead direction when an object moves relative to an object with a stochastic surface structure, in which the surface structure is imaged on at least two similar photosensors arranged behind one another at a defined separation in the straight-ahead direction and having a spatially resolving longitudinal extent transverse to the straight-ahead direction, a spatial frequency signal corresponding to the surface structure is generated by the sensors, the spatial frequency signal of a second sensor in the movement direction is read, temporally shifted relative to the spatial frequency signal of the first sensor, such that the same, at least partially overlapping surface structure is imaged on both sensors, the spatial frequency signals of the first and second sensors are correlated to determine a correlation coefficient, and the lateral offset of the correlated spatial frequency signals on the sensors is determined.

15 Claims, 1 Drawing Sheet

U.S. PATENT DOCUMENTS

| | | | |
|---|---|---|---|
| 2002/0021450 A1* | 2/2002 | Aoki | 356/499 |
| 2004/0221790 A1 | 11/2004 | Sinclaire et al. | |
| 2006/0045314 A1 | 3/2006 | Gao et al. | |
| 2009/0213359 A1* | 8/2009 | Fourcault et al. | 356/28 |

FOREIGN PATENT DOCUMENTS

| | | |
|---|---|---|
| DE | 44 44 223 A1 | 6/1996 |
| JP | 62-194415 A | 8/1987 |
| WO | WO 01/38843 A1 | 5/2001 |

\* cited by examiner

US 8,064,047 B2

METHOD AND APPARATUS FOR CONTACTLESS DETERMINATION OF A LATERAL OFFSET RELATIVE TO A STRAIGHT-AHEAD DIRECTION

CROSS REFERENCE TO RELATED APPLICATIONS

This application is a continuation of international patent application no. PCT/DE2008/000278, filed Feb. 15, 2008 designating the United States of America and published in German on Aug. 21, 2008 as WO 2008/098568, the entire disclosure of which is incorporated herein by reference. Priority is claimed based on Federal Republic of Germany patent application no. DE 10 2007 008 002.8, filed Feb. 15, 2007.

BACKGROUND OF THE INVENTION

The present invention relates to a method and an apparatus for contactless determination of a lateral offset relative to a straight-ahead direction when an object moves relative to an object with a stochastic surface structure, by imaging the surface structure on a photosensor.

Conventionally, for this purpose, a sensor is attached to an object in motion, by means of which measured variables relative to another object with a stochastic surface can be detected. For example, an object in motion can be a vehicle, the movement of which relative to the road surface is detected. Often in such cases, the lateral offset is to be determined as a deviation of the vehicle movement from straight-ahead travel. For as long as the vehicle travels, for example, straight ahead and no disruptive influences act on the vehicle, no lateral offset can be detected. It is conceivable that, for example, a side wind gust impinging upon a vehicle moving straight ahead displaces the vehicle laterally.

The invention relates particularly to a method and an apparatus for determining the angle as a variable for a deviation in the movement from the straight-ahead direction or target direction. In particular, the invention relates to a method and an apparatus for measuring the slip angle.

The slip angle is an important parameter in automotive technology and the development of non-rail-bound land vehicles. In the field of tire development, for example, by this means, conclusions can be drawn regarding the side forces and the running behavior of the tires of a vehicle.

The slip angle in this case is understood to be the angle between the direction in which a tire points and the direction in which it actually moves on the road surface. If, according to this, a tire has a large slip angle, a large lock angle is necessary in order to bring about the desired change of direction. The stiffer the tire construction, the smaller, usually, is the slip angle and the safer is the vehicle handling, although usually at the cost of comfort.

A tire which points straight ahead whilst the vehicle moves evenly straight ahead therefore has a slip angle of 0°; a tire which points 5° to the left whilst the vehicle continues to move straight ahead due, for example, to aquaplaning, has a slip angle of 5°.

Using simultaneous measurement of the slip angle at the front and rear wheels, conclusions can be drawn regarding the drift angle, that is the rotation of the whole vehicle relative to the movement direction.

U.S. Pat. No. 5,371,677 (=DE 40 30 653) describes a method for determining the slip angle of a braked vehicle. In the method described therein, based on a simplified vehicle model and using the wheel speed, the wheel angle, the yaw angle and the main brake cylinder pressure as measured variables, the slip angle is determined as an estimated variable. The method therefore requires a plurality of measured variables that have additionally to be detected or are known. It is not a measurement, but an estimation of the slip angle that is undertaken.

SUMMARY OF THE INVENTION

It is an object of the invention to provide a method for contactless determination of the lateral offset relative to a straight-ahead direction when an object moves relative to an object with a stochastic surface structure, in particular for high-resolution determination of the slip angle.

It is a further object of the invention to provide an apparatus with which the lateral offset can be determined to a high degree of accuracy, even at low speeds, which has a compact and light construction, few components that are liable to faults, and which provides measurement results for determining the slip angle, independently of distance, and with consistent accuracy.

These and other objects are achieved by providing a method and an apparatus as described and claimed hereinafter. Advantageous preferred embodiments are also described and claimed.

The method and the apparatus according to the invention are characterized in that the lateral offset is determined relative to a pre-determined straight-ahead direction when an object moves relative to another object with a stochastic surface structure in that the surface structure is imaged on a photosensor situated in the image plane of an optical system. The photosensor comprises at least two similar sensor elements arranged, one behind the other, at a defined separation in the straight-ahead direction. The accuracy of determination of the lateral offset can be increased with further sensor elements arranged in a similar manner behind the second sensor element. The sensor elements have a spatially-resolving longitudinal extent transverse to the straight-ahead direction and generate a spatial frequency signal which corresponds to the surface structure and is read out with an electronic unit. The spatial frequency signal of a sensor element arranged second in the movement direction is temporally shifted relative to the spatial frequency signal of the first sensor element so that the same surface structure is imaged, at least partially overlapping, on both sensor elements. In order to determine a correlation coefficient, the spatial frequency signals of the first and second sensor elements are correlated with one another in a computer unit. The size of the lateral offset of the correlated spatial frequency signals from one another on the spatially resolving sensor elements is determined with the aid of the correlation coefficient generated in the computer unit. Naturally, in place of at least two discrete, that is, individual sensor elements, special chips, for example, photodiode chips which have a plurality of sensor elements with a spatially resolving longitudinal extent transverse to the straight-ahead direction, behind one another in the movement direction on a carrier, can be used. In this case, the separation of the individual sensor elements is reproducible with high accuracy and does not have to be determined with complex measuring technology and possibly calibrated, as would be the case on production from individual elements.

Advantageously, the movement velocity is also determined and, depending thereon, the time shift between reading out the first and second sensor elements is stipulated. The more accurately the movement velocity v in the straight-ahead direction, and thus perpendicular to the longitudinal extent of the sensor elements, is determined, the more accurately the optimum time shift t can be stipulated as a function of the defined separation $s_a$ between the first and a second sensor element ($t=s_a/v$).

Another possibility for improving accuracy consists therein that a plurality of the n second sensor elements are read sequentially with time shifts n×t. All the second spatial frequency signals determined in this way are correlated with the first spatial frequency signal and, from this, an optimum correlation coefficient for determining the lateral offset on the spatially resolving sensor elements is calculated. The numerical value 1 is assumed, for example, as a maximum for the ideal correlation coefficient, so that an optimum correlation coefficient should, by definition, approach 1 as closely as possible.

In another embodiment of the invention, in addition to the time shift determined with the aid of the movement velocity, a time range is defined within which a second sensor element is read a plurality of times. Subsequently, every second spatial frequency signal is correlated with the first spatial frequency signal and therefrom, an averaged correlation coefficient is calculated. In this way, particularly in the low relative velocity range, any inaccuracy occurring in the determination of the movement velocity can be compensated for and a greater accuracy achieved when determining correlation coefficients.

If photodiode lines with strip-shaped photodiode elements ($n_i$) parallel to the straight-ahead direction with a strip width b are selected as spatially-resolving sensor elements, the calculation of the correlation coefficient can be carried out with a particularly low calculation effort. In this case, the correlation coefficients ($r(i)$) are calculated according to the equation $$r(i) = \frac{\sum_{i=1}^{n} x_i y_i - n\overline{x}\overline{y}}{\sqrt{\left(\sum_{i=1}^{n} x_i^2 - n\overline{x}^2\right)\left(\sum_{i=1}^{n} y_i^2 - n\overline{y}^2\right)}}$$

where r(i): the correlation coefficient as a function of i
n: the number of photodiode elements
i: the index (1 . . . n)
$x_i$: the photodiode signal of the first line
$\overline{x}$: the mean value of all the photodiode signals of the first line
$y_i$: the photodiode signal of the second line and
$\overline{y}$: the mean value of all the photodiode signals of the second line.

In this way, the lateral offset can be determined in that the index value $i_{max}$ for which the function of the correlation coefficient is a maximum (MAX[r(i)]) is determined. The amount of the lateral offset $s_b$ is then very easily calculated from the known strip width b of the strip-shaped photoelements, multiplied by the index value $i_{max}$.

In another embodiment of the invention, an angle α is calculated from the geometrical relationship between the separation $s_a$ of the sensor elements from which readings are taken in the straight-ahead direction and the amount of the lateral offset $s_b$ where $\alpha=\arctan s_b/s_a$.

An improvement in the quality of the spatial frequency signals generated by the photodiode lines is achieved if the exposure time of the sensor elements is matched to the movement velocity of the sensor relative to the surface structure. The exposure time is understood in this case to be the time over which the photodiode signal is built up, i.e., integrated, in the sensor element. In order to counteract the smoothing of the spatial frequency signal, at high velocities, a shorter exposure time should be selected, whereas at slower velocities, a longer exposure time is allowed. In order to obtain sufficient light energy on the sensor elements, it is advantageous for the photodiode lines, particularly at high velocities and short exposure times, if the surface structure to be imaged is additionally illuminated with an illumination device.

In a particularly advantageous embodiment of the invention, the time shift between the reading of the first and second sensor elements is selected, taking into account the imaging magnification of the optical system, so that sections of the surface structure which overlap in the movement direction are imaged on the sensor elements. For a given mutual separation $s_a$ of the sensor elements and an imaging magnification A of the optical system, the time shift is therefore calculated as the quotient of the separation $s_a$ and the velocity v multiplied by the imaging magnification A ($t=s_a/A\cdot v$).

The more accurately the time shift is determined, the better the correlation coefficient can be determined. Deviations are tolerable within a particular range, but the section of the surface structure imaged on the first sensor element should not have become displaced by more than the height of one photodiode element (pixel) on one of the second photodiode elements, since otherwise the correlation can no longer be carried out reliably. In this way, it is ensured that the two spatial frequency signals detected can be correlated with one another.

In order to avoid a change in the imaging magnification of the optical system due to a change of separation between the sensor device and the surface structure to be imaged, according to the invention, the optical system is configured for telecentric imaging of the surface structure. In this way, a large working distance range can be achieved. By targeted alteration of the imaging magnification of the optical system, the sensor system can be matched, in particular, to the geometry (separation and width of the pixels) of the strip-shaped photodiode elements and to different properties of the stochastic surface structure, in order to obtain spatial frequency signals that are readily evaluated.

If, according to the invention, a distance sensor is also provided, by taking account of a changing imaging magnification, for example, on exceeding the telecentric working distance range, the resulting altered imaging magnification can be taken into account and the working distance range can be increased. However, in this way, by dispensing with the telecentric property of the optical system, the known distance-dependent change in the imaging magnification can be taken into account, based on the measured distance. Often, when a telecentric optical system is employed, light energy is lost due to the pinhole apertures used. If this energy is needed for signal generation, on use of the distance sensor, the optical system for telecentric imaging of the surface structure can be omitted. The sensor thus constructed is also able to provide almost distance-unrelated measurement results.

In a further embodiment of the apparatus, a velocity sensor for determining the relative velocity in the straight-ahead direction, that is, perpendicular to the longitudinal extent of the sensor elements, is also provided. Particularly, velocity sensors operating contactlessly, which supply the absolute value of the velocity of the sensor perpendicular to the longitudinal extent of the sensor elements and thus independently of the movement angle are suitable for determining the optimum time shift between the reading of the first and a second sensor element.

It has been found that, in a particularly simple embodiment of the apparatus, the sensor element can comprise two photodiode lines with strip-shaped photodiode elements (pixels)

parallel to the straight-ahead direction and the spatial frequency signals have a surprisingly high quality. In this way, compactly constructed and economically produced sensors can be realized with standardized photodiode lines.

A diode line with, for example, 512 pixels, each having a width of approximately 12 μm and a height of 250 μm, is suitable for use in the sensor device described above. In this case, it has surprisingly been found that, even with overlapping imaging of the surface structure on only 100 pixels of the second diode line, a successful correlation can be carried out. The correlating capability of the spatial frequency signals of the two diode lines determines the maximum lateral offset that can be detected. With regard to the calculation and the resolving accuracy of the angle, or slip angle, this means that the resolution depends on the separation $s_a$ of the sensor elements from one another. The further apart the diode lines are, the greater is the resulting resolving power, but the smaller is the maximum angle that can be determined. Through use of longer diode lines, the maximum determinable angle can be increased. The maximum length of the usable diode lines is limited by the field of view of the imaging optical system.

Since the optimum time shift between reading the first and a second sensor element depends on the velocity and the imaging magnification of the optical system and becomes ever shorter at high velocities, the reading frequency of the diode line must either be dynamically adaptable to the time shift or must be selected to be high enough so that the diode line can still be read fully during the shortest possible time shift (at maximum velocity).

BRIEF DESCRIPTION OF THE DRAWINGS

An illustrative embodiment of an apparatus according to the invention will now be described in greater detail with reference to the accompanying drawings, in which.

DETAILED DESCRIPTION OF PREFERRED EMBODIMENTS

Figure 1:
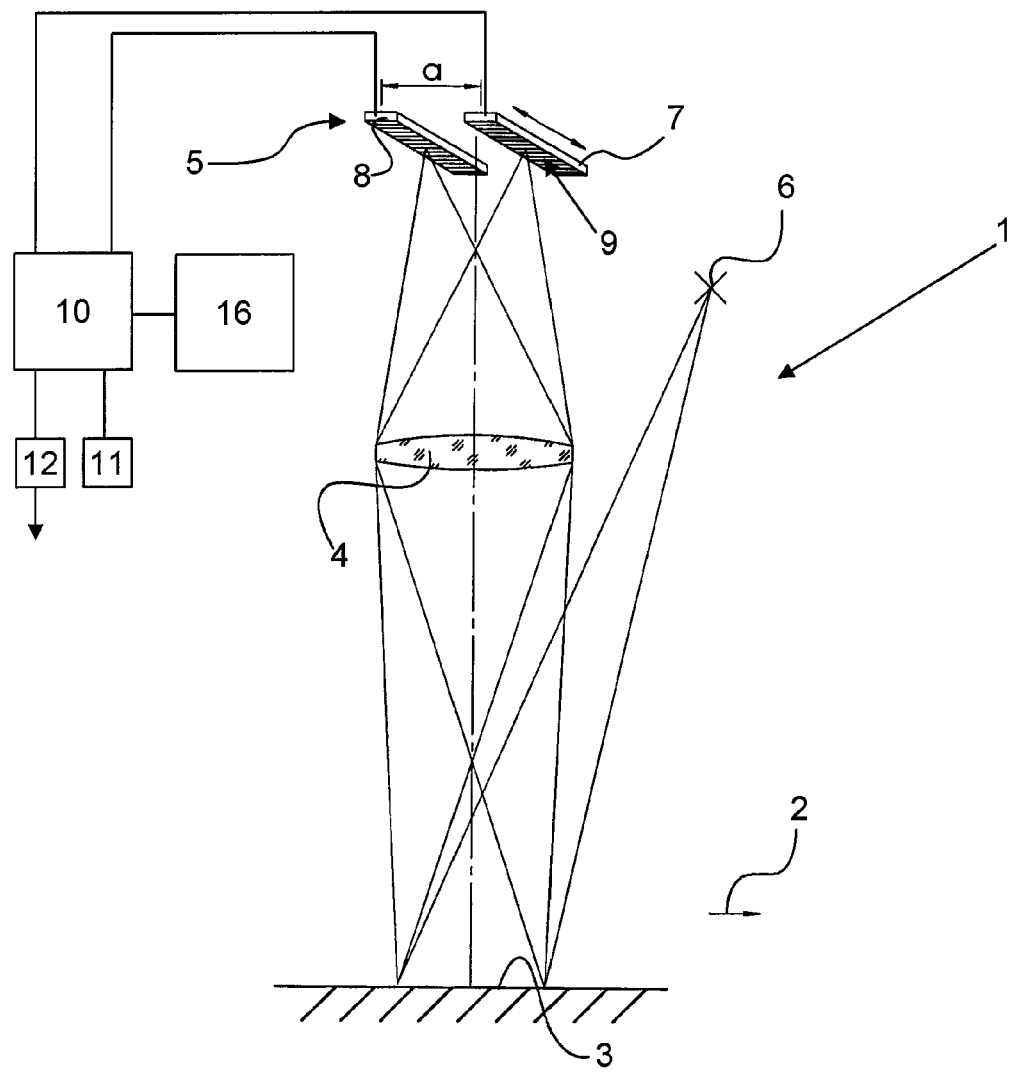
FIG. 1 is a simplified perspective representation of the sensor device.

FIG. 1 shows a sensor device 1 in a simplified perspective representation. The movement in the straight-ahead direction 2 relative to an object with a stochastic surface is represented by an arrow. A region of the surface structure 3 to be imaged is imaged on a sensor apparatus 5 by an optical system 4 indicated by a lens. The region of the surface structure 3 to be imaged is illuminated obliquely by an illumination device 6 in order to achieve a type of dark field illumination to improve the contrast. The sensor apparatus 5 comprises a first photodiode line 7 and a second photodiode line 8 arranged at a distance a therefrom. In the longitudinal extent, the photodiode cells 7, 8 comprise n strip-shaped pixels 9. An electronic unit 10 is provided for controlled reading of the photodiode cells 7, 8. The electronic unit 10 also processes the signals of a schematically illustrated velocity sensor 11 and of an optionally provided distance sensor 12. The signals processed by the electronic unit 10 are fed to a computer unit 16 for correlation. The whole sensor device 1 is arranged in a housing (not shown).

Figure 2:
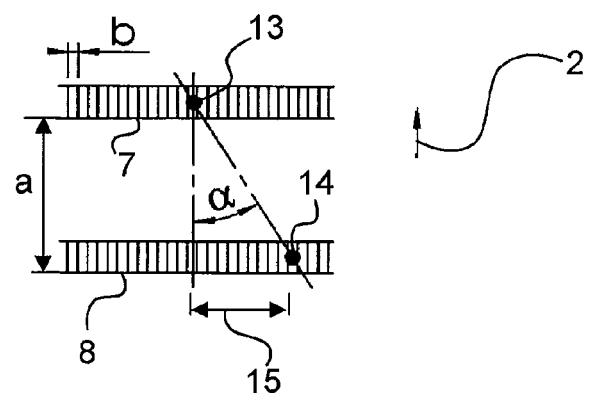
FIG. 2 shows the geometric arrangement of the sensor elements.

FIG. 2 shows the geometric arrangement of the photodiode cells 7, 8 and their separation a. The straight-ahead direction is illustrated with the arrow 2. Shown on the first diode line 7 is a point 13 which, as the point 14, illustrates the lateral offset 15 of the spatial frequency signal on the second photodiode line 8. The slip angle α can be determined from the geometric relationship between the separation a and the lateral offset 15, which is found by multiplying the pixel width b by the number of pixels of the lateral offset.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A method for contactless determination of the lateral offset relative to a straight-ahead direction when an object moves relative to an object with a stochastic surface structure with imaging of the surface structure on a photosensor, wherein:

the surface structure is imaged on at least two similar sensor elements on the moving object arranged one behind the other at a defined separation in the straight-ahead direction, said sensor elements having a spatially resolving longitudinal extent transverse to the straight-ahead direction;

a spatial frequency signal corresponding to the surface structure is generated by the sensor elements;

the spatial frequency signal of a sensor element which is second in the movement direction is read, temporally shifted relative to the spatial frequency signal of the first sensor element such that the same, at least partially overlapping, surface structure is imaged on both sensor elements, and the spatial frequency signals of the first and second sensor elements are correlated with one another to determine a correlation coefficient, and the size of the lateral offset of the correlated spatial frequency signals from one another on the spatially resolving sensor elements is determined from the correlation coefficient.

2. The method as claimed in claim 1, wherein the relative movement velocities are also determined, and the time shift between reading the first and second sensor elements is set as a function of the determined relative movement velocities.

3. The method as claimed in claim 1, wherein
in addition to the time shift, a plurality of the second sensor elements are read sequentially;
every second spatial frequency signal is correlated with the first spatial frequency signal, and
an optimum correlation coefficient is calculated from the correlations between the first and second spatial frequency signals.

4. The method as claimed in claim 1, wherein:
in addition to the time shift, a time range is defined within which a second sensor element is read a plurality of times;
every second spatial frequency signal is correlated with the first spatial frequency signal, and
an averaged correlation coefficient is calculated from the correlations between the first and second spatial frequency signals.

5. The method as claimed in claim 1, wherein the spatially resolving sensor elements are photodiode lines with strip-shaped photodiode elements (ni) parallel to the straight-ahead direction, and correlation coefficients (r(i)) are calculated according to the equation:

$$r(i) = \frac{\sum_{i=1}^{n} x_i y_i - n\overline{x}\overline{y}}{\sqrt{\left(\sum_{i=1}^{n} x_i^2 - n\overline{x}^2\right)\left(\sum_{i=1}^{n} y_i^2 - n\overline{y}^2\right)}}$$

where r(i): is the correlation coefficient as a function of i
n: is the number of photodiode elements
i: is the index (1 . . . n)
$x_i$: is the photodiode signal of the first line
$\overline{x}$: is the mean value of all the photodiode signals of the first line
$y_i$: is the photodiode signal of the second line and
$\overline{y}$: is the mean value of all the photodiode signals of the second line.

6. The method as claimed in claim 1, wherein an angle (α) is calculated from the geometric relationship between the separation (a) of the sensor elements from which readings are taken in the straight-ahead direction and the amount of the lateral offset.

7. The method as claimed in claim 2, wherein the exposure time of the sensor elements is adjusted as a function of the velocity.

8. The method as claimed in claim 2, wherein the time shift between the reading of the first and second sensor elements is selected taking account of the imaging magnification, so that the section of the surface structure imaged on the first sensor element is displaced by no more than the amount of the height of a photodiode element on one of the second photodiode elements.

9. An apparatus for contactless determination of the lateral offset relative to a straight-ahead direction when an object moves relative to an object with a stochastic surface structure with imaging of the surface structure on a photosensor, said apparatus comprising:

an optical system for imaging the surface structure;
at least two similar sensor elements on the moving object arranged in the image plane of the optical system, one behind the other, at a defined separation (a) from one another in the straight-ahead direction, said sensor elements having a spatially resolving longitudinal extent transverse to the straight-ahead direction;
an electronic unit for controlled reading of the spatially resolving signals of the sensor elements, and
a computer unit for correlating the signals read from the sensor elements and for calculating the offset of the images of the surface structure on the sensor elements.

10. The apparatus as claimed in claim 9, wherein the optical system is configured for telecentric imaging of the surface structure.

11. The apparatus as claimed in claim 9, further comprising a distance sensor.

12. The apparatus as claimed in claim 10, further comprising a velocity sensor for determining the relative velocity in the straight-ahead direction.

13. The apparatus as claimed in claim 11, further comprising a velocity sensor for determining the relative velocity in the straight-ahead direction.

14. The apparatus as claimed in claim 9, wherein said sensor elements each comprise a photodiode line having a strip-shaped photodiode element parallel to the straight-ahead direction.

15. The apparatus as claimed in claim 9, further comprising an illumination apparatus for illuminating the surface structure to be imaged.

* * * * *